United States Patent [19]

Hiyama et al.

[11] 4,372,266
[45] Feb. 8, 1983

[54] FUEL INJECTION APPARATUS FOR INTERNAL COMBUSTION ENGINES

[75] Inventors: Yasuhiro Hiyama, Musashino; Hidekazu Oshizawa, Kumagaya; Kenji Okamoto, Higashimatsuyama; Masayoshi Kobayashi, Kawagoe, all of Japan

[73] Assignee: Diesel Kiki Co. Ltd., Tokyo, Japan

[21] Appl. No.: 276,001

[22] Filed: Jun. 22, 1981

[30] Foreign Application Priority Data

Jun. 30, 1980 [JP] Japan ............................ 55-087934

[51] Int. Cl.³ .......................................... F02D 31/00
[52] U.S. Cl. ..................................... 123/357; 123/494
[58] Field of Search ............... 123/357, 358, 359, 478, 123/480, 486, 487, 494; 73/119 A

[56] References Cited

U.S. PATENT DOCUMENTS

| | | | |
|---|---|---|---|
| 3,575,145 | 4/1971 | Steiger | 123/357 |
| 3,903,852 | 9/1975 | Sola | 123/357 |
| 4,012,948 | 3/1977 | Kuno et al. | 73/119 A |
| 4,174,694 | 11/1979 | Wessel et al. | 123/357 |
| 4,294,211 | 10/1981 | Stumpp et al. | 123/357 |

*Primary Examiner*—Ira S. Lazarus
*Assistant Examiner*—Magdalen Moy
*Attorney, Agent, or Firm*—Guy W. Shoup; Gerard F. Dunne

[57] ABSTRACT

In a fuel injection apparatus comprising an actuator for driving a member for controlling the amount of fuel injected, a computing circuit for computing a first signal representing an optimum amount of fuel injected on the basis of the engine operation conditions and a signal generator for generating a second signal representing the amount of fuel injected from an injection nozzle, the signal generator has a detector for generating a position signal indicative of the position of needle valve of the injection nozzle at the instant of injection, a converting circuit for converting the position signal into an open area signal representing an open area of the injection nozzle and a computing circuit for computing a signal indicative of the actual amount of fuel injected on the basis of the open area signal.

7 Claims, 9 Drawing Figures

FUEL INJECTION APPARATUS FOR INTERNAL COMBUSTION ENGINES

The present invention relates to a fuel injection apparatus, more particularly to an electronically controlled fuel injection apparatus for internal combustion engines, which is capable of controlling the amount of fuel injected with high precision.

A conventional electronically controlled fuel injection apparatus is provided with an electrical actuator for controlling the position of a fuel control member for adjusting the amount of fuel injected and is adapted to detect the position of the fuel control member and input the position detection signal so obtained, as a feedback signal, to a circuit for controlling the electrical actuator, thereby to control the amount of fuel injected to a desired target value. Thus, in the conventional system, the position of a fuel control member such as a rack or a control sleeve is detected, instead of measuring the actual amount of fuel injected, and the actual amount of fuel injected is estimated from the detected position in accordance with a previously known relationship between the position of the fuel control member and the amount of fuel injected. Therefore, errors caused by mechanical abrasion in the fuel injecting mechanism of the system cannot be corrected in the control system and it is quite difficult to carry out stable and highly precise control of the amount of fuel injected over a long period of time.

It is, therefore, an object of the present invention to provide an improved electronically controlled fuel injection apparatus for internal combustion engines.

It is another object of the present invention to provide an electronically controlled fuel injection apparatus which is capable of carrying out precise control of the amount of fuel injected over a long time.

It is a further object of the present invention to provide an electronically controlled fuel injection apparatus for internal combustion engines which can precisely control the amount of fuel injected from a pump without being effected by possible changes in dimensions due to mechanical abrasion of the fuel injection pump mechanism.

The fuel injection apparatus according to the present invention comprises an actuator for driving a member for controlling the amount of fuel injected, a computing circuit for computing a first signal representing the optimum amount of fuel to be injected on the basis of, for example, signals representing the engine speed and the degree of depression of the acceleration pedal, and a signal generator for generating a second signal representing the amount of fuel injected from an injection nozzle. The signal generator has a detector for generating a position signal indicative of the position of a needle valve of the injection nozzle at the instant of injection and the second signal is produced on the basis of the change in the position of the needle valve as indicated by the position signal. In order to produce the second signal, the position signal can be converted into an open area signal representing the open area of the injection nozzle at the instant of injection in accordance with the relationship obtained in advance between the position of the needle valve and the open area of the nozzle, and the actual amount of fuel injected can be obtained by integrating the open area signal. Thus, the actuator is driven and controlled in accordance with the result of a comparison between the first signal with the second signal in such a way that the amount of fuel injected is always the optimum amount.

Further objects and advantages of the present invention will be apparent from the following detailed description to be read in conjunction with the accompanying drawings in which.

Figure 4:
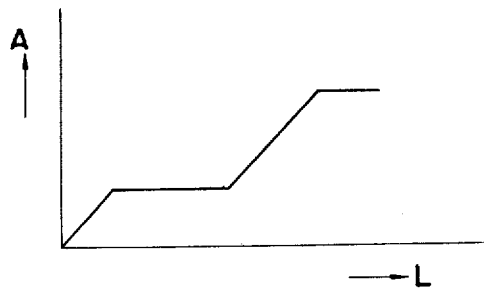
Figure 2:
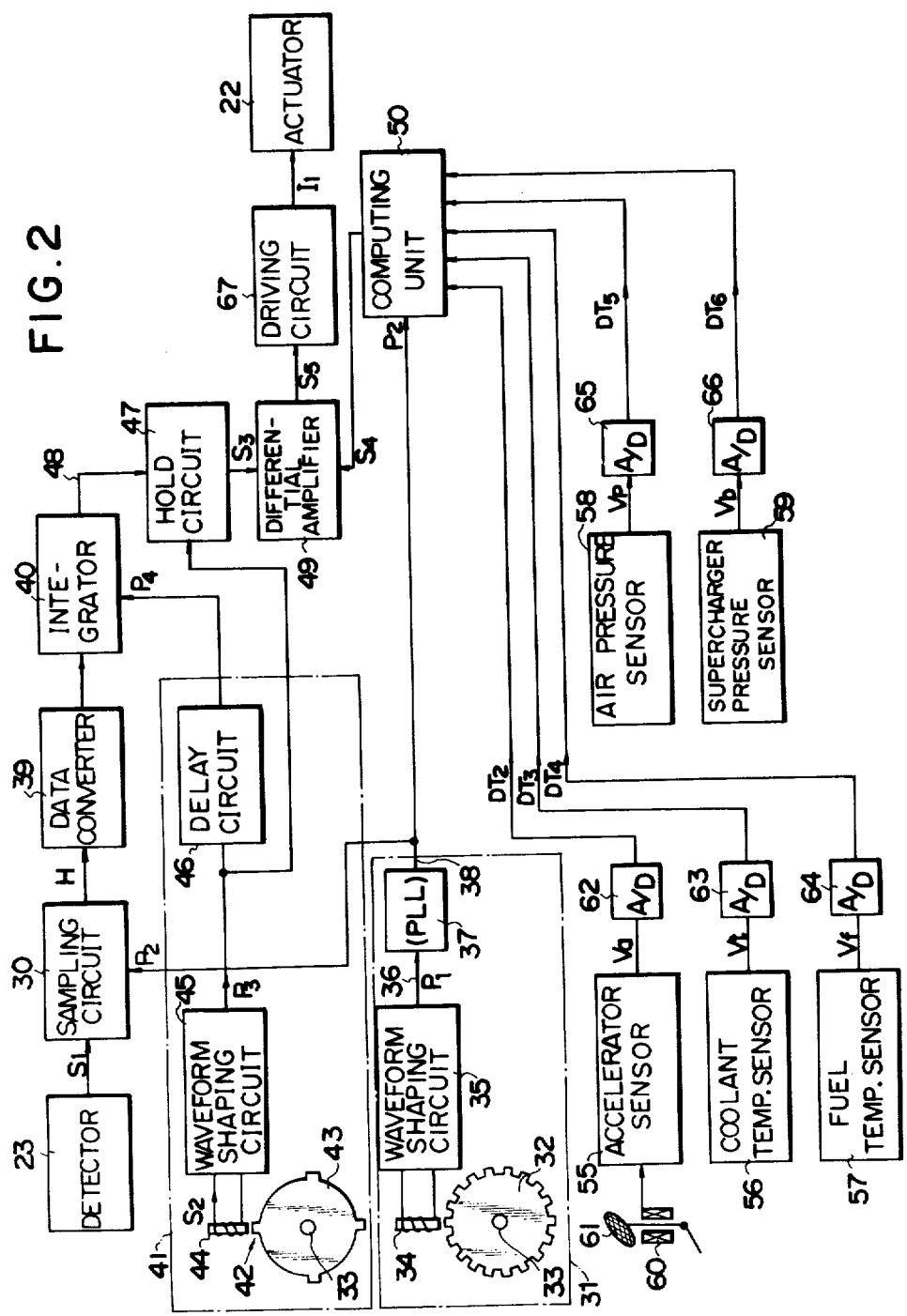
FIG. 2 is a block diagram of the control system of the embodiment illustrated in FIG. 1.

FIGS. 3(A) to 3(F) are signal waveform diagrams for explaining the operation of the control system of FIG. 2; and FIG. 4 is a characteristic curve diagram showing the relation between the position of the nozzle of an injection nozzle and the open area thereof.

Figure 1:
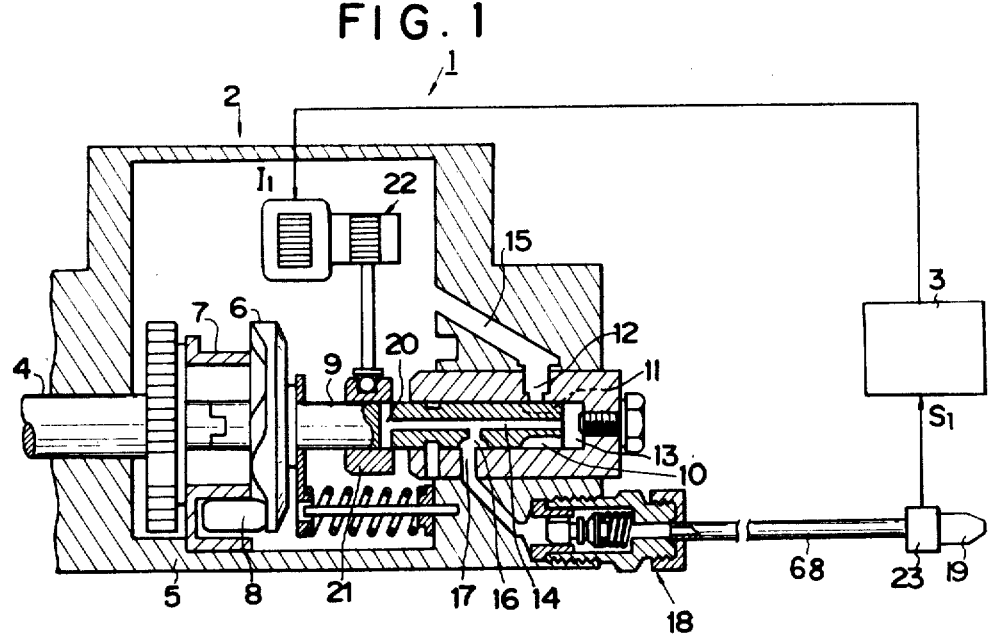
FIG. 1 is a sectional view of the mechanical portion of one embodiment of the present invention.

FIG. 1 is a schematic view of one type of a fuel injection apparatus embodying the present invention. The electronically controlled fuel injection apparatus 1 of the present invention is composed of a fuel injection pump 2 and a control unit 3 for electronically controlling the amount of fuel injected from the fuel injection pump 2. The fuel injection pump 2 includes a drive shaft 4 supported by a housing 5 and driven by a Diesel engine (not shown), a cam disc 6 rotated by the drive shaft 4, and a roller holder 7 having a plurality of rollers 8 (only one roller 8 is seen in FIG. 1). The cam disc 6 causes the plunger 9 to reciprocate and rotate simultaneously, in accordance with the rotation of the drive shaft 4. The plunger 9 has, at one end portion thereof, intake slits 10, 11 provided as many as the number of cylinders of the engine. (Only two intake slits are shown in the figure.) When an intake slit comes opposite an intake port 12 during the back stroke of the plunger 9, pressurized fuel passes through a passage 15 into a high-pressure chamber 13 and a passage 14 formed in the plunger 9. Compression of the pressurized fuel introduced into the chamber 13 is begun when the intake port 12 is closed by the outside wall of the plunger 9 due to the reciprocating motion of the plunger 9. When a distributor slit 16 communicating with the passage 14 comes opposite an outlet passage 17 after further forward motion of the plunger 9, the compressed high-pressure fuel in the high pressure chamber 13 passes through a delivery valve 18 and is supplied into a combustion chamber of the engine through an injection pipe 68 and an injection nozzle 19 mounted on the engine. Although only one delivery valve 18 and corresponding injection nozzle 19 are illustrated in FIG. 1, a plurality of delivery valves and corresponding injection nozzles are provided in the actual apparatus. In FIG. 1, valves and nozzles are omitted to simplify the explanation. When the plunger 9 is further advanced by the cam disc 6, a cut-off port 20 communicating with the passage 14 is disengaged from a control sleeve 21 to terminate the fuel injecting operation. The amount of fuel injected is adjusted by the relative position between the control sleeve 21 and the plunger 9. To permit the adjustment, the control sleeve 21 is coupled to an electromagnetic actuator 22. The magnitude of a current $I_1$ to be supplied to the electromagnetic actuator 22 is controlled by the control unit 3 so as to change the position of the control sleeve 21 for freely adjusting the amount of fuel injected. The control unit 3 includes a circuit for controlling the driving of the electromagnetic actuator 22. The injection nozzle 19 is provided with a detector 23 for producing a position signal $S_1$ which varies in magnitude with the amount of displacement of a needle valve (not shown) of the injection nozzle 19. The detector is composed of an induction coil and a core which is displaced relative to the induction coil in accordance with the displacement of the needle valve. Since the structure of the injection nozzle having such a detector is known in the prior art, a detailed description is omitted. The position signal $S_1$ produced by the detector 23 is applied to the control unit 3, in which the current ($I_1$) for driving the electromagnetic actuator 22 is generated as described in more detail hereinafter.

Figure 3:
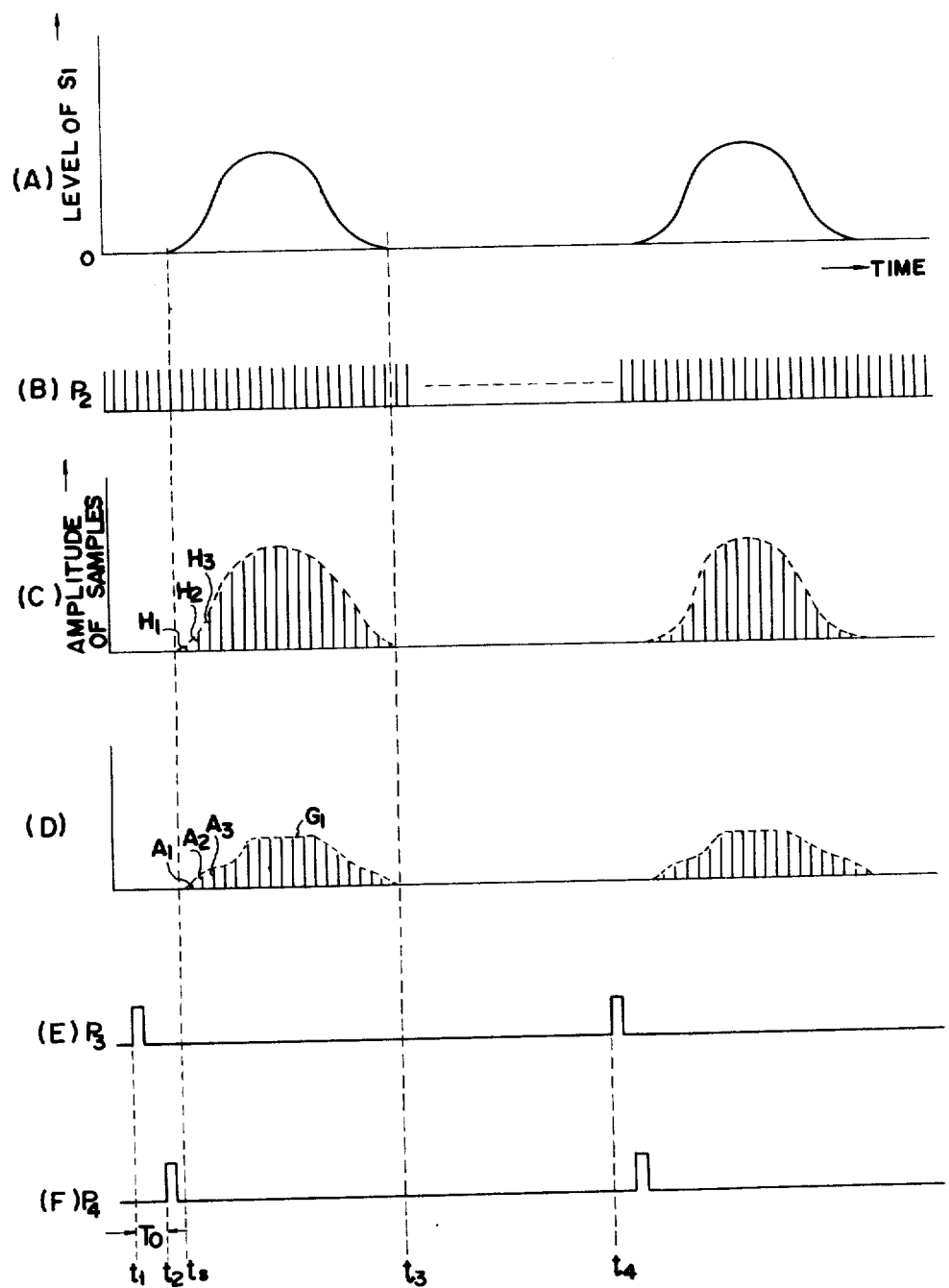

FIG. 2 illustrates a block diagram of the control system of the apparatus shown in FIG. 1. The detector 23 mounted on the injection nozzle 19 generates the position signal $S_1$, the level of which shows the amount of the displacement or the position of the needle valve of the injection nozzle 19 at every instance as shown in FIG. 3(A) and the position signal $S_1$ is applied to a sampling circuit 30 to which the pulse train signal $P_2$ produced by an engine speed detector 31 is supplied as sampling pulses. The engine speed detector 31 comprises a gear 32 secured to the crankshaft 33 of the engine associated with fuel injection pump 2 so as to rotate with the engine and an electromagnetic pick-up coil 34 located close to gear 32. A large number of cogs are formed on the periphery of gear 32 and a variable a.c. output signal is produced from the electromagnetic pick-up coil 34 as the cogs approach and then move away from coil 34 with the rotation of the engine. The output signal from coil 34 is put into a waveform shaping circuit 35 to generate a square wave signal having the same frequency as that of the output signal from the coil 34. Since the cogs of gear 32 are formed at equal intervals on the periphery of gear 32, the pulse train signal $P_1$ derived from the waveform shaping circuit 35 (shown in FIG. 3(B)) is composed of pulses produced one each time the crankshaft 33 rotates by a predetermined angle.

In this embodiment, since gear 32 has eighteen cogs, one pulse is produced by the circuit 35 for every 20 degrees of rotation of gear 32. The above-mentioned pulse train from the waveform shaping circuit 35 is sent through an output line 36 to a frequency multiplier 37.

Frequency multiplier 37 is a phase locked loop (PLL) circuit and the pulse train signal $P_1$ appearing on line 36 is multiplied in frequency. Thus, a resulting signal with a frequency N-times as great as that of the signal from the circuit 35 is produced by the frequency multiplier 37. The value of N can be arbitrarily selected. When a multiplication rate of 40 is selected for the frequency multiplier 37, for example, it follows thus that the pulse train signal $P_2$ appearing on an output line 38 is composed of pulses each produced as crankshaft 33 rotates by 0.5 degrees of rotation of the gear 32 (shown in FIG. 3(B)).

Thus, the position signal $S_1$, which is an analog signal, is sampled in the sampling circuit 30 by the use of the pulses of the pulse train signal $P_2$, and the signal sampled at given rotation angle intervals of the engine is produced as sampling data H composed of a series of the samples $H_1, H_2, H_3, \ldots$ (FIG. 3(C)).

The sampling data H is applied to a data converter 39 which converts the data H indicating the displacement of the needle valve of the injection nozzle 19 into data indicating the open area of the injection nozzle at that time. In order to carry out the above-mentioned data converting operation, the circuit of the data converter 39 is arranged so that the relationship between the input level and the output level of the data thereof corresponds to the relationship between the displacement L of the needle valve and the open area A of the injection nozzle 19, as shown in FIG. 4. The relationship shown in FIG. 4 may be obtained by experiments in advance and the data converter 39 can easily be designed on the basis of the relationship illustrated in FIG. 4. Therefore, each time one of the samples $H_1, H_2, \ldots$ is applied to the data converter 39, the data converter 39 produces an output $A_1, A_2, \ldots$ showing the open area of the injection nozzle in response to the application of the samples $H_1, H_2, \ldots$ (FIG. 3(D)). After the data indicating the displacement of the needle valve has been so converted into the data indicating the open area, the results $A_1, A_2, \ldots$ are input to an integrator 40.

In order to assure the integration by the integrator 40 of every group of data $A_1, A_2, \ldots$, produced for each injection of fuel, there is provided an integration control circuit 41. The integration control circuit 41 includes a timing generator 42 for generating a predetermined timing signal $S_2$ indicative of a time which is a little before the time of fuel injection. The timing generator 42 is composed of a gear 43 secured to the crank shaft 33 and an electromagnetic pick-up coil 44 located close to gear 43. The cogs of gear 43 are formed at intervals of 90 degrees, for a four cylinder engine. Since the positional relationship between gear 43 and coil 44 is such that one of the cogs of gear 43 is opposite coil 44 a little before each fuel injection, coil 44 produces the timing signal $S_2$ indicative of a time a little before the fuel injection time, and this signal $S_2$ is applied to a waveform shaping circuit 45 to produce the timing pulses $P_3$ (FIG. 3(E)). Timing pulses $P_3$, which are indicative of the same times as the signal $S_2$, are input into a delay circuit 46 where they are delayed by a predetermined time $T_0$. The pulses delayed by the delay circuit 46 are applied as reset pulses $P_4$ to the integrator 40. The value of $T_0$ is determined in such a way that each pulse $P_4$ is applied to the integrator 40 prior to the corresponding start time of injection fuel. As a result, the integrator 40 is reset by a pulse $P_4$ just before the start of each of the respective fuel injecting operations, and then, the integrator 40 integrates the group of the data $A_1, A_2, \ldots$ produced by the data converter 39 for that particular fuel injecting operation. The result of the integrating operation is applied to a hold circuit 47 through an output line 48 and the result is held in the hold circuit 47 every time a pulse $P_3$ is produced and applied as a hold timing pulse to the hold circuit 47.

The operations of the integrator 40, the hold circuit 47 and the integration control circuit 41 will now be described in more detail in conjunction with FIGS. 2 and 3(D) to 3(F). As described above, prior to starting of the fuel injecting operation at time $t_s$, the timing pulse $P_3$ is produced from the waveform shaping circuit 45 at time $t_1$, and after this, the corresponding reset pulse $P_4$ is applied to the integrator 40 at time $t_2$. Since the value of the delay time effected by the delay circuit 46 is selected to be less than the value of $t_s - t_1$ as described hereinbefore, the data $A_1, A_2, \ldots$ which belong to a group $G_1$ shown in FIG. 3(D) are integrated by the integrator 40 after the integrator 40 is reset by the reset pulse $P_4$ and the integrating operation for the data $A_1, A_2, \ldots$ of the group $G_1$ is finished at the time $t_3$. Since the data $A_1, A_2, \ldots$ represent the open area of the injection nozzle 19 in that instance, it follows that the result of the integration represent the magnitude of the "effective open area" for one fuel injecting operation and the actual amount of fuel injected from the injection nozzle 19 is a function of the magnitude of the effective open area. The result of the integration by the integrator 48 and is held by the hold circuit 47 upon receipt of the next pulse $P_3$ which is generated at the time $t_4$ before starting the next integrating operation. The integrator 40 is reset by the application of the reset pulse $P_4$ at the time $t_5$ just after the termination of the holding operation of the hold circuit 47. Thus, the data held by the hold circuit 47 is renewed every time the fuel injecting operation is carried out and an output signal $S_3$ indicative of the held data is applied to a differential amplifier 49 as a signal indicative of the actual amount of fuel injected. Since the signal $S_3$ can thus be obtained from the open area calculated on the basis of the actual amount of displacement of the needle valve, the actual amount of fuel injected represented by the signal $S_3$ is more accurate than that in the conventional system wherein the signal indicating the amount of fuel injected is obtained by detection of the position of the fuel control member, and the value represented by the signal $S_3$ is substantially equal to the true amount of fuel injected. Even if a dimensional error should, for example, occur because of abrasion of some part of the fuel injection pump, e.g., the plunger, cam disc, control sleeve, etc., the signal $S_3$ will still accurately indicate the actual amount of fuel injected.

For the purpose of producing a signal indicative of the optimum amount of fuel to be injected into the engine depending upon the condition of the engine operation at that instant, there is provided a computing unit 50 in which the optimum amount of fuel to be injected is computed on the basis of various factors related to the operating condition of the engine, and a signal $S_4$ indicative of the computed optimum amount is produced and is applied to the other input terminal of the differential amplifier 49. The differential amplifier 49 produces an error signal $S_5$ corresponding to the difference in magnitude between the signals $S_3$ and $S_4$.

For providing the information concerning the engine speed to the computing unit 50, the pulse train signal $P_2$ indicative of the engine speed is applied to the computing unit 50. Moreover, for the purpose of detecting the conditions of engine operation, there are provided an accelerator sensor 55, a coolant temperature sensor 56, a fuel temperature sensor 57, an air pressure sensor 58 and a supercharger pressure sensor 59. The accelerator sensor 55 is connected to a sensor coil 60 for generating an electric signal which varies in accordance with the degree of depression of an accelerator pedal 61, and an analog voltage signal $V_a$ indicative of the degree of depression of the accelerator pedal 61 is produced by accelerator sensor 55. A conventional position sensor may be employed as the accelerator sensor 55. The coolant temperature sensor 56 includes a thermistor mounted on the cylinder head of the engine and produces an analog voltage signal $V_t$ which varies in magnitude in accordance with the coolant temperature of the engine. The fuel temperature sensor 57 has a structure similar to that of the sensor 56 and produces an analog voltage signal $V_f$ which varies in magnitude in accordance with the fuel temperature of the engine. The air pressure sensor 58 and the supercharger pressure sensor 59 are arranged so as to produce analog voltage signals $V_p$ and $V_b$ which vary in magnitude with the air pressure and the supercharger pressure, respectively. These analog voltage signals $V_a$, $V_t$, $V_f$, $V_p$ and $V_b$ are converted into digital form by analog-digital (A/D) converters 62 to 66, respectively, to produce digital data $DT_2$ and $DT_6$.

Data $DT_2$ to $DT_6$ and signal $P_2$ are applied to the computing unit 50, in which the optimum amount of fuel to be injected at each instant is computed on the basis of these input data and signal. As is well known, the optimum amount depends upon the engine operation conditions at each instant, and the relationship between the optimum amount of fuel to be injected and the engine operation conditions can usually be determined experimentally. That is, the optimum amount of fuel to be injected at each instant is a function of the various operating conditions of the engine. In this embodiment, the computing unit 50 has a memory in which an empirical formula representing the relationship between the optimum amount of fuel to be injected and the operating conditions of the engine is stored and the optimum amount of fuel is computed in accordance with the empirical formula. An ordinary digital microcomputer may be employed for this purpose. The computed result is converted into an analog signal indicative of the optimum amount of fuel to be injected and the analog signal is output as the signal $S_4$. The error signal $S_5$ representing the difference between the optimum amount of fuel to be injected and the actual amount of fuel injected is amplified by a driving circuit 67 and the driving circuit 67 supplies the driving current $I_1$ to the actuator 22 to cause it to lower the level of the error signal $S_5$ to zero.

With the arrangement as described above, it becomes possible to obtain an injection quantity signal which extremely accurately represents the actual injection quantity. Moreover, even if the relative position between the plunger and the control sleeve should deviate from the initially set value due to abrasion of mechanical parts of the fuel injection pump, it is possible to compensate for the deviation by the control system, without any undesired influence on the control result. Thus, it is possible to ensure accurate control of the fuel injection quantity over a longer period of time, irrespective of mechanical abrasion of the mechanical parts.

Although the present invention has been described in connection with a distribution type fuel injection system, it is by no means limited to the distribution type fuel injection system and may be applied to any other type of fuel injection system.

In accordance with the present invention, as described above, extremely accurate detection of the injection quantity is possible and the detected result is not affected by possible dimensional errors in the mechanical parts of the fuel injection system, which ensures accurate and sure control of the injection quantity.

We claim:

1. A fuel injection apparatus for internal combustion engines, in which said apparatus has a fuel injection pump having a member for adjusting the amount of fuel injected from an injection nozzle, said apparatus comprising:

an actuator for driving said member;
a first signal generator for generating a first signal indicative of the optimum amount of fuel to be injected under the existing engine operation conditions;
a detector for generating a position signal indicative of the position of a needle valve of the injection nozzle at every instant;
a second signal generator for generating a second signal indicative of the actual amount of fuel injected on the basis of the change in said position signal;

means for comparing said first signal with said second signal; and a circuit for driving said actuator in accordance with the resulting signal from said comparing means so as to bring the actual amount of fuel injected into accord with the optimum amount.

2. A fuel injection apparatus as claimed in claim 1 wherein said second generator has a data converter for converting the position signal into an open area signal representing the open area of said injection nozzle, and means for computing a second signal indicative of the actual amount of fuel injected on the basis of the open area signal.

3. A fuel injection apparatus as claimed in claim 2 wherein said computing means is a circuit for integrating the open area signal to produce said second signal.

4. A fuel injection apparatus as claimed in claim 1 wherein said position signal is an analog signal which varies in magnitude in accordance with the displacement of the needle valve of said injection nozzle.

5. A fuel injection apparatus as claimed in claim 4 wherein said second generator has a sampling circuit for sampling said position signal at a predetermined time interval, a data converter for converting respective sampling data produced from said sampling circuit into data representing the open area of said injection nozzle in accordance with the relationship obtained experimentally beforehand between the amount of displacement of the needle valve and the amount of the open area of the injection nozzle each time the respective sampling data is produced, and a circuit for integrating the data from said data converter to produce said second signal.

6. A fuel injection apparatus as claimed in claim 5 wherein said apparatus has an engine speed sensor for generating a pulse train signal which varies in frequency in proportion to the engine speed, and the pulse train signal is applied as sampling pulses to said sampling circuit.

7. A fuel injection apparatus as claimed in claim 5 wherein said apparatus has a reset circuit for resetting said integrating circuit prior to every fuel injecting operation of said injection nozzle.

* * * * *